United States Patent [19]

Brandon

[11] 4,370,534

[45] Jan. 25, 1983

[54] APPARATUS AND METHOD FOR HEATING, THAWING AND/OR DEMOISTURIZING MATERIALS AND/OR OBJECTS

[76] Inventor: Deryck Brandon, P.O. Box 176, Charlottesville, Va. 22902

[21] Appl. No.: 247,261

[22] Filed: Mar. 25, 1981

Related U.S. Application Data

[63] Continuation-in-part of Ser. No. 229,523, Jan. 29, 1981, abandoned, which is a continuation of Ser. No. 28,601, Apr. 9, 1979, Pat. No. 4,256,944.

[51] Int. Cl.³ .............................................. H05B 6/80
[52] U.S. Cl. ...................... 219/10.55 A; 219/10.55 F; 219/10.55 D; 219/10.55 M; 34/1
[58] Field of Search ................. 219/10.55 A, 10.55 R, 219/10.55 M, 10.55 F, 10.55 D; 105/451; 104/1; 34/1, 4; 165/1

[56] References Cited

U.S. PATENT DOCUMENTS

| | | | |
|---|---|---|---|
| 2,500,752 | 3/1950 | Hanson et al. | 219/10.55 A |
| 3,505,490 | 4/1970 | Gorn | 219/10.55 A |
| 3,560,347 | 2/1971 | Knapp et al. | 219/10.55 A |
| 3,569,657 | 3/1971 | Levinson | 219/10.55 R |
| 3,601,448 | 8/1971 | Stone | 219/10.55 M |
| 3,800,858 | 4/1974 | Placek | 105/451 X |
| 3,992,287 | 11/1976 | Rhys | 219/10.55 R |

Primary Examiner—B. A. Reynolds
Assistant Examiner—Philip H. Leung
Attorney, Agent, or Firm—Oblon, Fisher, Spivak, McClelland & Maier

[57] ABSTRACT

An apparatus and method for heating, thawing and/or demoisturizing materials and/or objects by means of microwave energy. In one embodiment for heating particulate material stored in an open-faced rail car, a hood having a length twice that of the car and provided with shielding strips is mounted such that the shielding strips engage the car to form a shield microwave cavity between the hood and the car. The car is then transported beneath the hood, with the shielded cavity being maintained by the shielding strips, and irradiated by microwave energy emitted from magnetrons mounted on the hood. In another embodiment, drilling devices coupled to a microwave source penetrate a substance to be heated. Then, the microwave source is energized and emits microwave energy to the substance at the penetration depth. As the drilling device is extracted, the source is maintained energized for at least a part of the extraction period. Applications in the fields of coal thawing, insect pest control and oil recovery are prime candidates for the disclosed technology.

18 Claims, 16 Drawing Figures

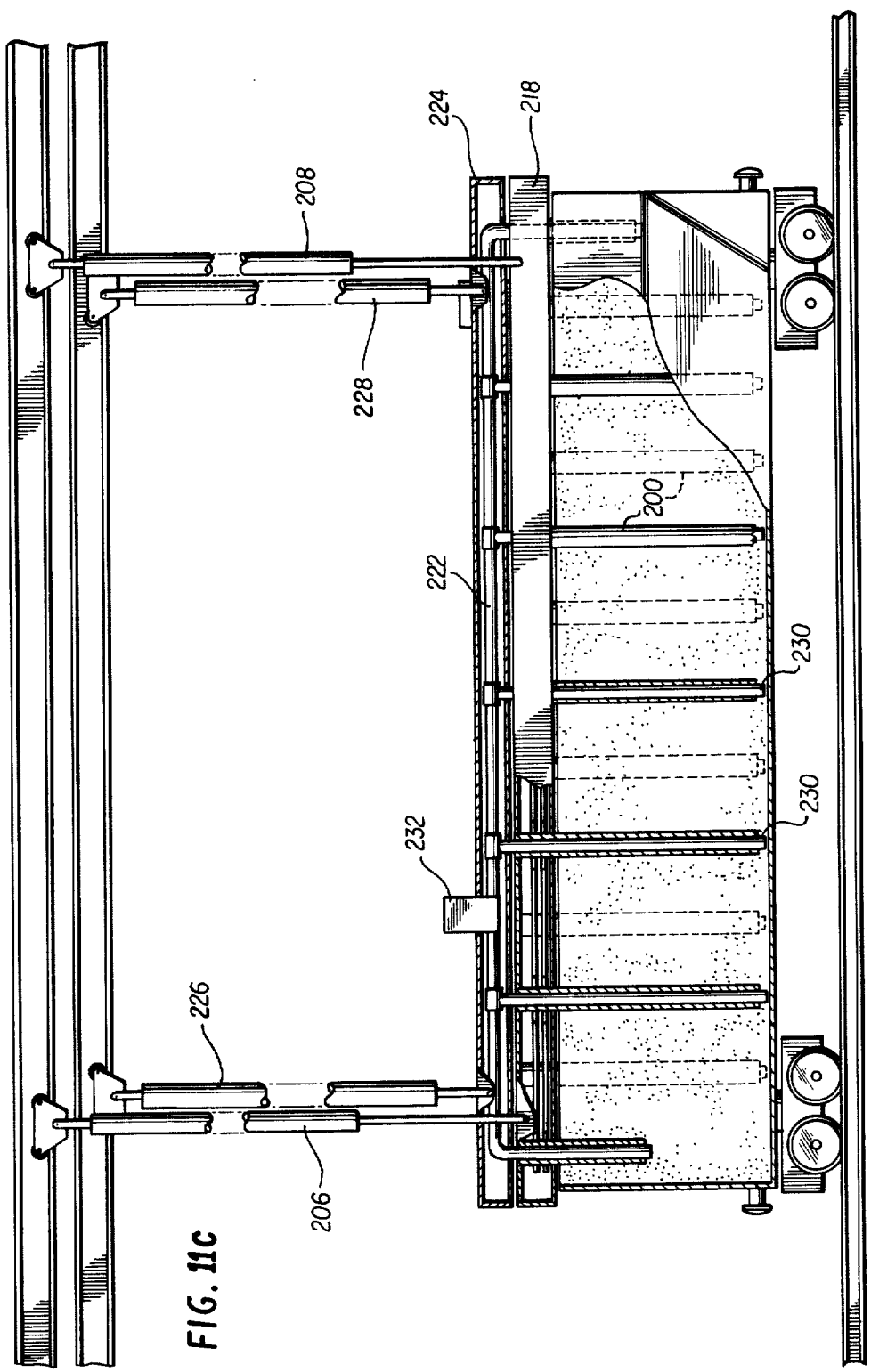

APPARATUS AND METHOD FOR HEATING, THAWING AND/OR DEMOISTURIZING MATERIALS AND/OR OBJECTS

CROSS-REFERENCE TO RELATED APPLICATIONS

This is a continuation in part of U.S. patent application Ser. No. 229,523 filed Jan. 29, 1981, now abandoned which is a continuation of U.S. application Ser. No. 028,601 filed Apr. 9, 1979, which issued as U.S. Pat. No. 4,256,944.

BACKGROUND OF THE INVENTION

1. Field of the Invention

This invention relates to an apparatus and method for heating, thawing and/or demoisturizing materials and/or objects, and more particularly to such an apparatus and method employing microwave techniques to perform the requisite function.

2. Description of the Prior Art and Related Patent Applications

It is often required in any one of a number of industries to heat, thaw, or demoisturize materials, especially particulate type materials. Sometimes, it is even necessary to perform these functions on objects which are embedded in the material or otherwise located therein. A typical example is found in mining or other industries where natural and man-made particulate materials, such as lime, coke, coal, sand, gravel and ores (iron, etc.) are collected and transported, typically in broken or granular form, by open rail cars or the like. Typically, the open rail cars collect moisture due to rain, high relative humidity or from other sources. In cold or freezing weather these materials often become frozen, which renders discharge of the material stored in the rail cars difficult or impossible.

Various thawing methods and apparata have been proposed in the Prior Art. Early thawing efforts described in U.S. Pat. No. 2,507,775 included the building of wood fires under the cars, the holding of gas jets against the sides of the cars in various places, and the use of steam baths to which parts of the car or the whole care were subjected. These methods, have, however, proven unacceptable since they either subject the rail car to excessive localized temperatures which can cause buckling or other serious structural weakening of the car, descruction of the paint on the car, and/or in part insufficient heat to the car and its contents to ensure thorough thawing and/or demoisturizing of the material contained therein.

Modern attempts at providing economic and efficient railway car thawing systems have utilized electrical energy heating devices to perform the thawing. Thus, as is disclosed in U.S. Pat. No. 3,569,657, microwave energy is emitted through an access opening provided in the bed of a transport vehicle such as a truck trailer or a railway vehicle car, with the transport vehicle then serving as a microwave cavity for heating the contents thereof. However, this microwave heating system would appear to find utility only with special purpose vehicles specifically provided with microwave access openings, with the vehicles being closed to provide the requisite microwave cavity. Thus, in order to implement this system on a large scale, a massive capital expenditure would be required of the railroad industry to refurbish existing rail coal cars and the like. Furthermore, the microwave energy emitted through the access opening is progressively absorbed such that little microwave energy reaches the truck contents remote from the access opening, resulting in uneven thawing. While this problem can be remedied by employing microwave sources with higher power output, there are limited sources for such high power devices, which in any event are typically less reliable and entail more maintenance. Additionally, considerable leakage of the microwave energy occurs via the access opening, presenting a potential health hazard, and reducing the operating efficiency.

SUMMARY OF THE INVENTION

Accordingly, one object of this invention is to provide a new and improved apparatus and method for heating, thawing and/or demoisturizing materials using microwave energy produced from microwave sources of relatively low power output to improve efficiency and safety and to reduce maintenance.

Yet another object of this invention is to provide a new and improved method and apparatus by which frozen materials in a container can be rapidly, safely, and economically thawed for immediate discharge from the container.

A further object of this invention is to provide a novel apparatus and method for thawing, heating and/or demoisturizing material which can be easily automated.

Yet another object of this invention is to provide a novel method and apparatus for thawing, heating and/or demoisturizing materials contained in existing vehicular containers without the necessity of alteration or refurbishment of the containers.

Another object of this invention is to provide a novel method and apparatus for thawing using microwave energy to heat and thaw materials contained in a vehicular gondola container, which is sufficiently versatile to accommodate containers of varying lengths and widths.

A further object of this invention is to provide a novel method and apparatus for thawing employing plural magnetrons to produce a requisite amount of microwave energy for the heating and thawing of the material contained in a vehicular gondola container, and employing microwave shielding to protect against radiation leakage during the thawing process.

Another object of this invention is to provide a novel method and apparatus for selectively heating objects or things embedded or otherwise located in or on a material.

A further object of this invention is to provide an ecologically safe apparatus and method for insect pest elimination and control.

Another object is to provide a novel method and apparatus for mining oil containing substances, e.g., tar sands, oil shale rock, heavy oil deposits, etc.

These and other objects are achieved according to the invention by providing a novel apparatus and method for heating, thawing, and/or demoisturizing objects and/or materials utilizing microwave energy as the primary heating medium. The microwave techniques of the invention find application not only to the coal/particulate heating and thawing use disclosed in the above-referenced U.S. patent application Ser. No. 028,061, but also to new uses in the fields of insect pest control and mining as described hereinafter.

With regard to the application of the microwave techniques of the invention to the problem of heating, thawing and/or demoisturizing particulate matter stored in a gondola-type container such as a rail car, several new and improved apparata and methods are provided according to the invention. In a first embodiment, there is provided a shielding hood having a length at least twice that of the container to be heated, wherein the shielding hood is provided with shielding disposed in contacting engagement with the container to form an enclosed microwave cavity in the space between the hood/shielding and the container. In this embodiment, the container is transported between the ends of the shielding hood and during the time that the container passes beneath the microwave radiation source(s), the contents of the container are irradiated with microwave energy.

In another embodiment, the invention includes a drilling device capable of drilling into a material to be heated, which may be contained in a rail car or other container, to its full depth. The outward appearance of the drilling device is similar to that of a fluted drill or auger, designed with appropriate pitch and point to accomodate the diameter and speed of drill rotation. The central shaft of the auger is hollow from top to bottom, with the bottom thereof being closing off in order to form the point of the drill. The hollow section is provided with an appropriate cross-section so as to efficiently transmit microwave energy at a frequency of, for example, 915 MHz or 2450 Hz. Near the point of the drill and located on a side thereof is a ceramic microwave transparent window by which microwave energy passing through the waveguide section of the drill is emitted to the surrounding media to promote heating, thawing and/or demoisturizing of the material. In operation, at least one waveguide drilling device, and typically plural such devices arranged as an array, is placed under pressure against the surface of the material to be heated, thawed and/or demoisturized and caused to commence rotation and consequent drilling into the material. After the waveguide drilling device(s) have penetrated a predetermined distance into the material, typically to the bottom of the container holding the material, a microwave radiation source such as a magnetron is energized with the output of the generator coupled to the waveguide portion of the waveguide drill to pump energy through the waveguide portion through the ceramic window and into the material. The direction of rotation of the one or more waveguide drilling device is then reversed while microwave energy is emitted from the ceramic window of the waveguide drilling device resulting in extraction of the device and simultaneously heating of the material during extraction. In this way, the entire depth of the material is evenly heated, thawed and/or demoistured.

The waveguide drilling device of the invention finds advantageous application to the problem of insect pest control, and especially the control of fire ants which construct an extensive underground tunneling network making it impossible to eliminate such pests using conventional chemical techniques. According to the method of the invention, a waveguide drilling device is positioned over the insect nest, drilling commenced, power applied to the microwave source and microwave energy emitted into the underground insect tunneling network, effectively eliminating the pests in the process, as well as sterilizing the soil against bacteria or fungus. In the event that the insect nest does not have significant depth in the soil, it is not necessary to use the drilling feature, but instead, the hooded radiator is merely placed upon the nest, and radiation then commenced. The latter approach is also useful in connection with surface pest control, such as the irradication of insect larvae from plants by selecting a power output sufficiently lethal to the pest larvae, but nevertheless sufficiently low to avoid plant damage.

Another application of the microwave drilling apparatus of the invention is in the recovery of oil from shale rock, tar sands, heavy oil deposits, etc. Using the apparatus of the invention, it is possible to penetrate the oil resource, thereby to heat and liquify trapped oil which is then readily recoverable using conventional pumping techniques.

In yet another embodiment one or more core drilling devices, each being simpler in design and construction than the auger equipment above noted, is used to locate a microwave radiation source a predetermined depth within a material to be heated. Each device includes a core drill in the form of a cylindrical tube having a serrated or saw-toothed opened end which is firstly drilled into the material to be heated. Upon embedding of the core drill(s) into the material, there is provided one or more conventional augers used to extract material from the hollow centers of the core drills. Additionally provided are one or more waveguide radiators which then are inserted into respective hollow centers of the core drills after removal of the augers. Energy is then applied to the microwave source(s) coupled to a waveguide/radiator assembly and this assembly along with the core drill(s) is then gradually raised out of the materials with the waveguide/radiator assembly emitting microwave energy into the material to heat, thaw and/or demoisturize the material. Along with these pieces of equipment is provided an associated superstructure necessary to translate, lower and raise the various assemblies.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9b is a schematic top view illustrating the chain and sprocket drive system shown in FIG. 9a;

FIGS. 11a–11c are schematic cross-sectional views of a second embodiment of the apparatus of the invention employing core drilling techniques.

DESCRIPTION OF THE PREFERRED EMBODIMENTS

Figure 1:
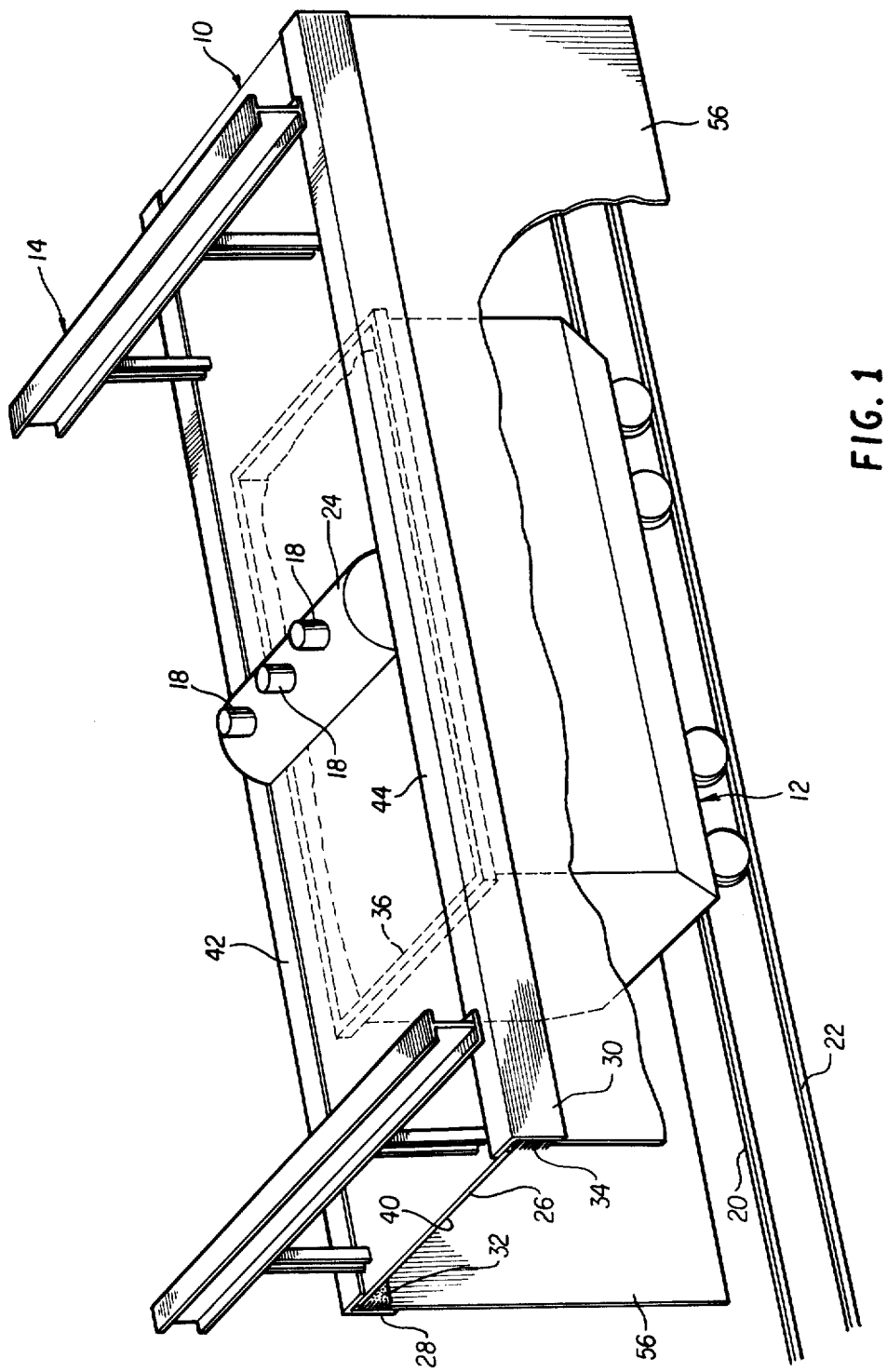
FIG. 1 is a schematic partially fragmentary perspective view of a scanning apparatus according to the invention used in connection with heating particulate matter contained in a gondola-type container.
Figure 3:
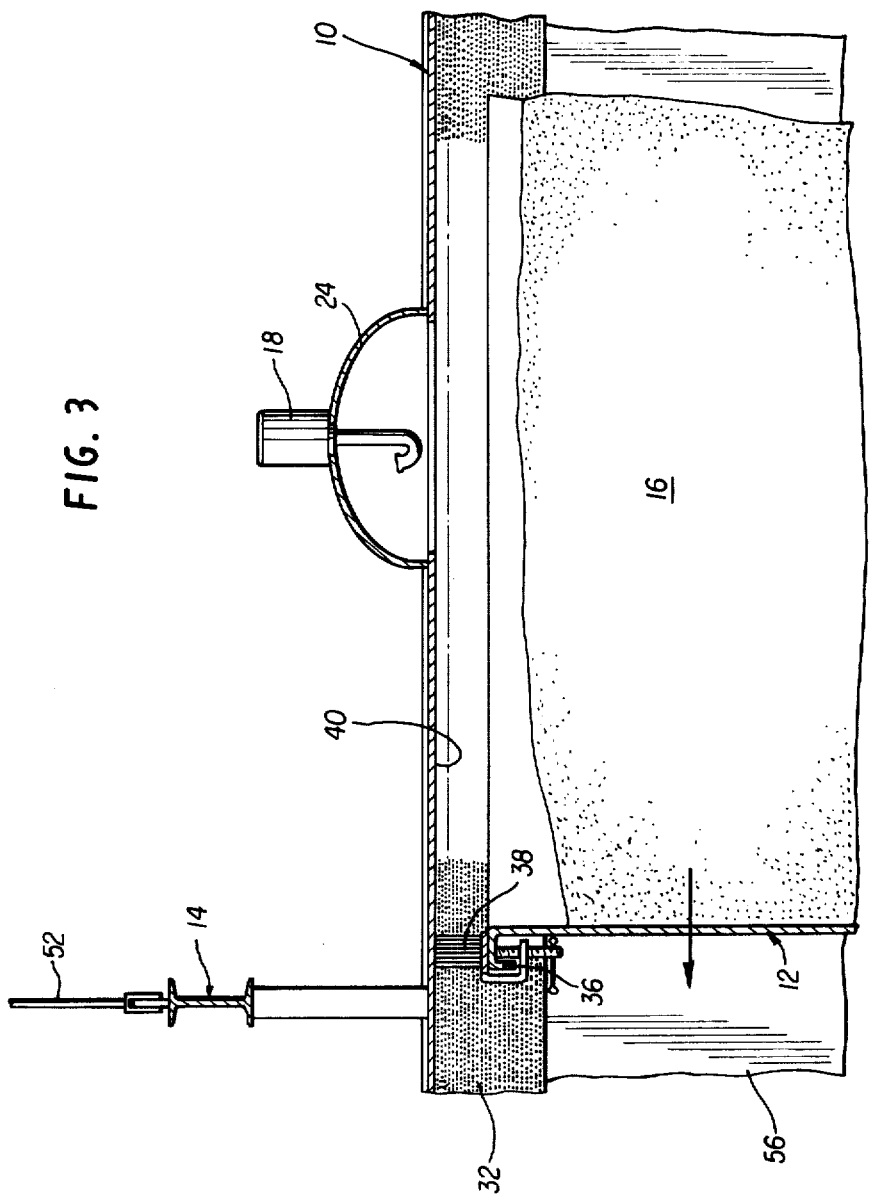
FIG. 3 is a fragmentary side view partially in section of the apparatus shown in FIG. 1.

Referring now to the drawings, wherein like reference numerals designate identical or corresponding parts throughout the several views, and more particularly to FIG. 1 thereof, there is shown in schematic perspective view a shielding hood 10 in relationship to a gondola-type rail car 12, in which the hood 10 is suspended from a hood carrier frame 14 which in turn is coupled to a building frame (not shown) by means of a plurality of hydraulically operated vertical positioning cylinders (not shown). As shown in FIG. 3, within the rail car 12 is a particulate material 16, for example coal, iron or ore, etc., which is to be heated, thawed and/or demoisturized by at least one and generally a plurality of microwave energy radiating magnetrons 18. The car 12 is movably supported on tracks 20 and 22, which are typically slightly sloped in order to facilitate gravity assisted transporting of the car 12 beneath the hood 10 for scanning of the particulate matter 16 contained in the car 12 with microwave energy emitted from the magnetrons 18.

As shown in FIG. 1, the magnetrons 18 are disposed in a curved central portion of the hood 10 which in effect forms a parabolic reflector 24 for concentrating microwave energy emitted from the magnetrons 18 into the particulate matter 16. Typically, the hood 10 has a length at least twice that of the longest rail car 12 expected to be used in hauling the particulate matter 16, which is necessary in order to maintain an enclosed shielded microwave cavity between the hood 10 and the car 12 as discussed in more detail hereinafter. However, by providing a hood 10 of sufficient length as noted, it is possible to accommodate cars 12 or varying lengths without the necessity of adjusting the lengthwise dimensions of the hood 10.

Figure 2:
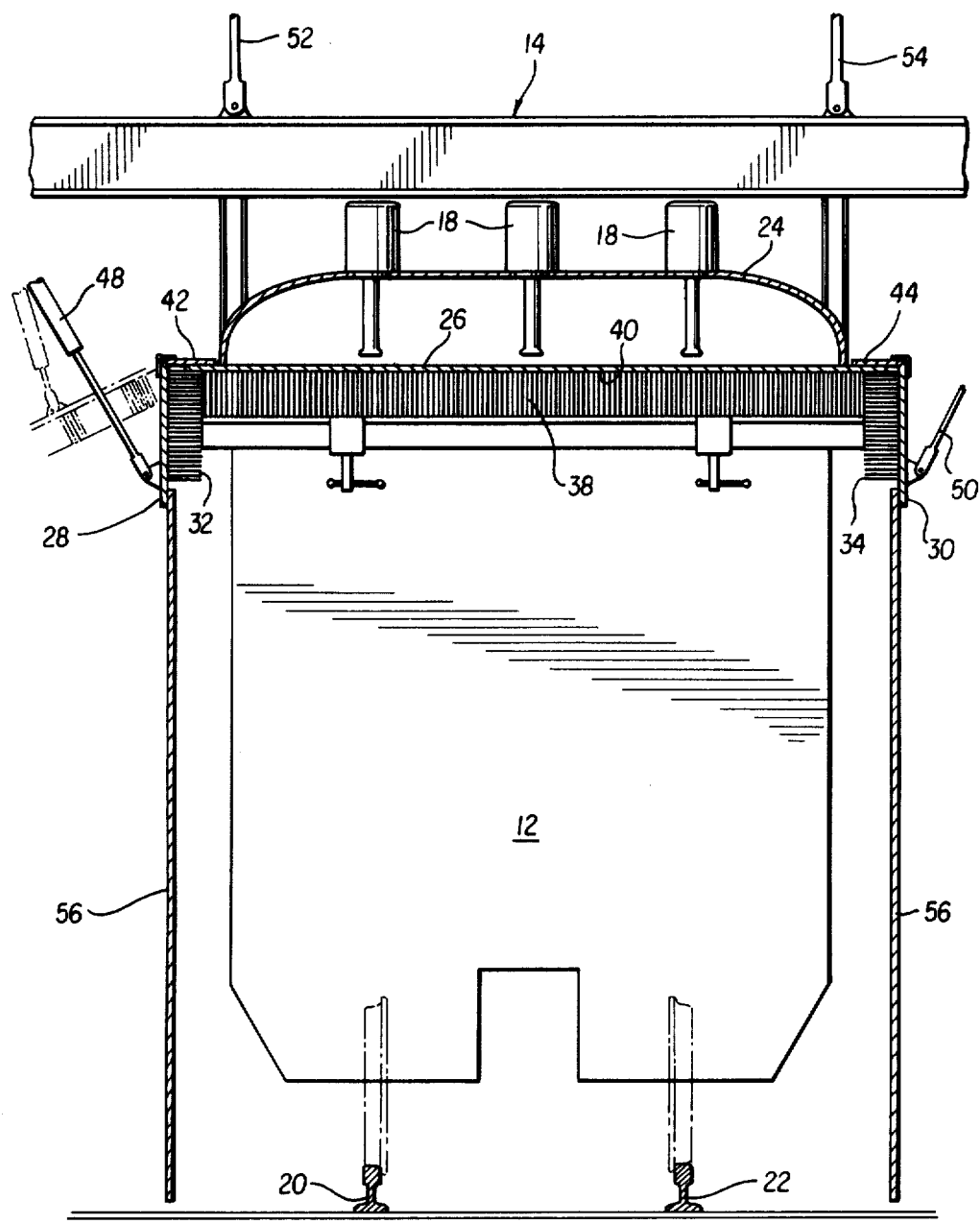
FIG. 2 is a schematic end view partially in section of the apparatus shown in FIG. 1.

As shown in FIG. 1, and in more detail in FIG. 2, the hood 10 is formed of a center member 26 and a pair of side members 28 and 30 hingedly connected to respective sides of the center member 26. The side members 28 and 30 are provided with respective shielding strips 32 and 34 which make engagement with the sides of the car 12. In FIG. 2, shielding strips 32 and 34 are shown engaging the sides of a car top flange 36 extending around the perimmeter of the open face of the car 12. As shown in FIG. 2, the end portion of the flange 36 along the width of the car 12 also has clamped thereto a respective shielding strip 38 extending the entire width of the car and being barely in contact with the shielding strips 32 and 34 provided on the hood side members 28 and 30. As is readily understood, the opposite end of the car 12 likewise has another shielding strip (not shown) mounted on the top flange 36 along the width of the car. Both of the shielding strips 38 contact the inner upper surface of the hood center member 26 such that a completely shielded and enclosed microwave cavity is formed between the side and end shielding strips and the center member 26 of the hood 10. In this way, microwave leakage from within the microwave cavity is minimized and essentially eliminated, thereby assuring safety to operator personnel and maximizing efficient heating of the particulate material 16.

The shielding strips 32, 34 and 38 can be implemented by means of commercially available brush strips having microwave radiation reflecting brush bristles. Brush strips having stainless steel brush strips have been found to be highly suitable in practicing the invention. Also, a carbon steel plate structure has likewise been found suitable in implementing the hood 10.

In order to minimize leakage from the interior of the microwave cavity formed by the hood 10 and the car 12, the hood side members 28 and 30 are oriented perpendicular to the car top flange 36 on which is clamped the brush strip 38. In order to accommodate cars 12 or varying widths, the hood center member 26 is provided with extendable submembers 42 and 44 at opposed sides of the center member 26. The submembers 42 and 44 are respectively hingedly connected to the side members 28 and 30. The extendable submembers 42 and 44 according to the invention overlap a stationary portion 46 of the center member 26 and are outwardly extendable by conventional means, either manual, or preferably automated, (not shown) whereby the width of the hood can be adjusted to accommodate cars 12 of different widths.

Also shown in FIG. 2 are hydraulic cylinders 48 and 50 whereby the hood side members 28 and 30 are respectively pivoted at the hinged connection to the extendable submembers 42 and 44. Also shown schematically in FIG. 2 are the previously mentioned hydraulic cylinders 52 and 54 coupled to the support frame 14, whereby the entire hood structure can be raised or lowered to accommodate cars 12 of varying heights.

As indicated above, the hood center member 26 is provided with extendable submembers 28 and 30 to accommodate varying car widths. Naturally, the length of the shielding strips 38 should be selected to accommodate the particular width of a coal car being thawed. Thus, although a single piece shielding strip 38 is shown in FIG. 2, it should be understood that a variable length shielding strip 38 can be easily implemented in two pieces with overelapping portions, which can be either manually or mechanically extended as needed to extend the entire width of a given car 12.

Figure 4:
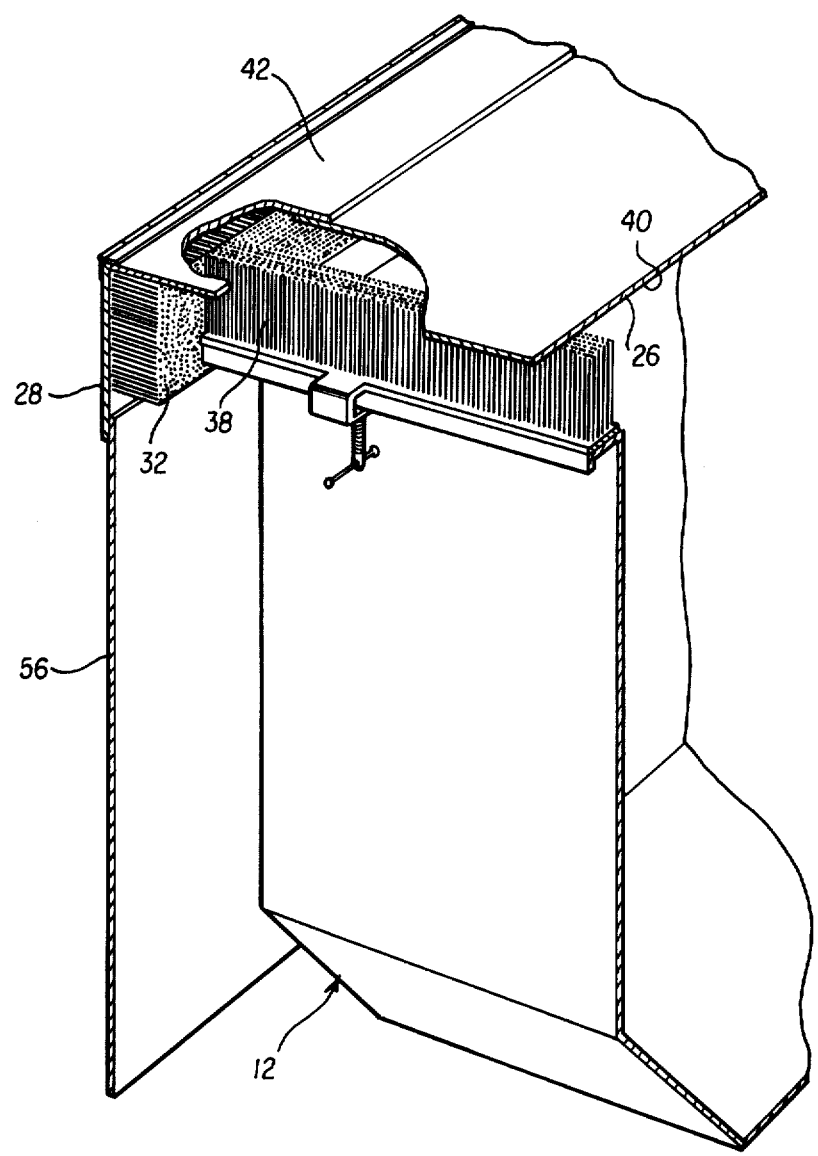
FIG. 4 is a fragmentary perspective view of a corner end portion of a gondola-type container illustrating the engagement of the container with the microwave shielding according to the invention.
Figure 5:
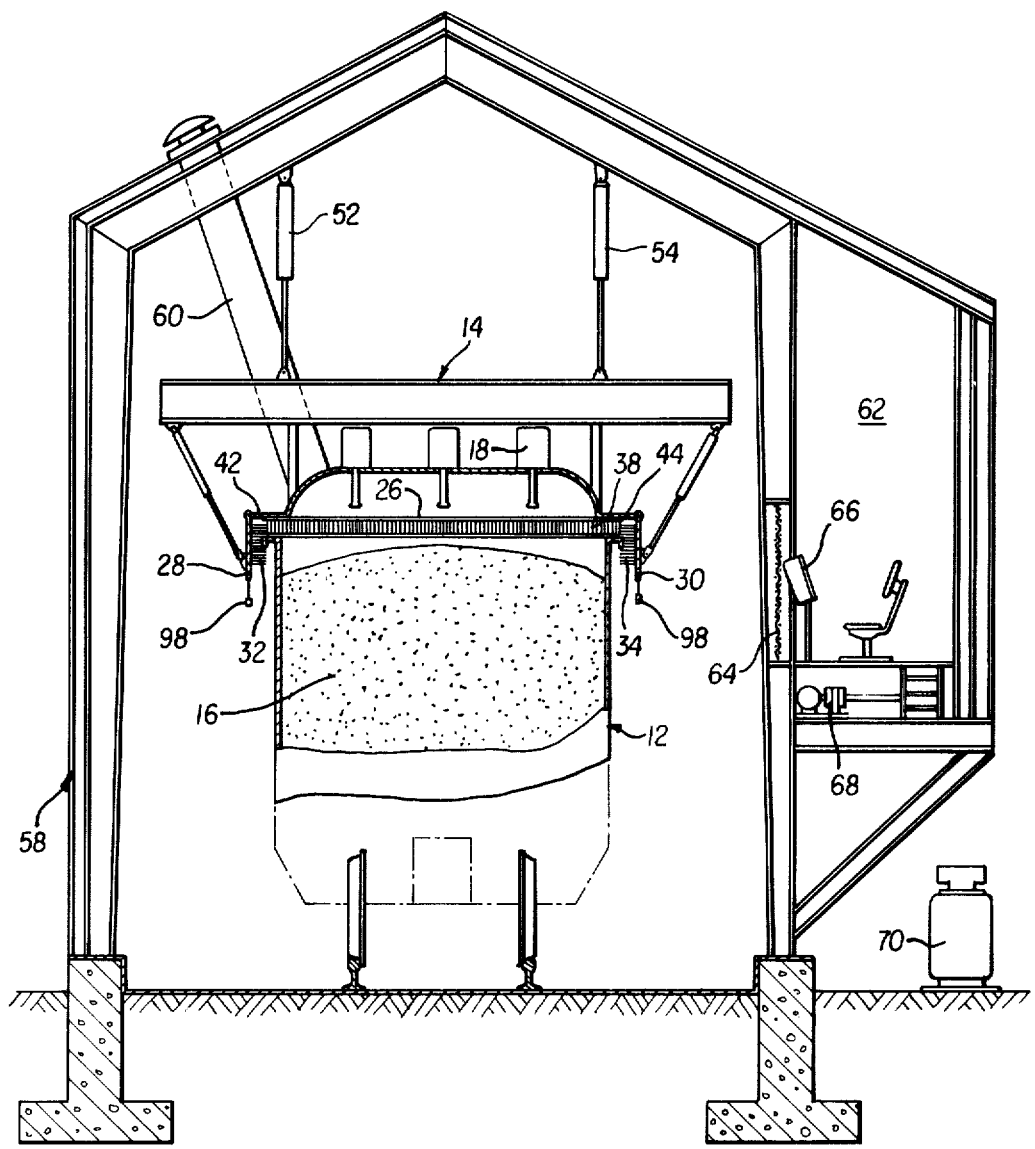
FIG. 5 is a schematic sectional end view illustrating the apparatus of FIG. 1 in relation to a gondola-type rail car on station during a heating, thawing and/or demoisturizing operation.

As shown in FIGS. 1, 2 and 4, it may be desirable to attach a microwave absorbent curtain 56 around the periphery of the hood 10 to absorb any microwave leakage which somehow or another manages to escape from the confines of the microwave cavity formed by the hood 10 and the car 12. Although the drawings only show the curtain 56 attached to the hood side members 28 and 30, it should be understood that the curtain can likewise be attached at either ends of the hood across the width thereof. Naturally, such additional absorbent curtains provided at the ends of the hood 10 must be removable for entry and exit of the car 12 in the space beneath the hood 10. While it is anticipated that the curtain 56 will not generally be necessary, expecially when heating is conducted in an enclosed building of the type as shown in FIG. 5, it may be desirable to provide the curtain 56 in the event that open-air microwave heating is contemplated. A sponge-like material impregnated with microwave absorbing particles sold under the trademark ECcosorb by Emerson and Cumming Corp., Gardena, California, is a suitable material for the curtain 56.

FIG. 4 is a self-explanatory fragmentary perspective view of a corner and end portion of the car 12 further illustrating the engagement of the car 12 with the microwave shielding strips 28 and 38 of the hood 10 of the invention.

FIG. 5 is a schematic sectional end view showing the car 12 on station within a building 58 during a heating, thawing, and/or demoisturing operation. As disclosed in my U.S. Pat. No. 4,256,944, the present invention likewise envisions the utilization of an exhaust system 60, shown schematically in FIG. 5, by which gases such as methane, water vapor, etc., released by the material being thawed are exhaused from the microwave cavity formed by the shielding hood 10 and the rail car 12 during a heating, thawing and/or demoisturing operation. The exhaust system 60 may include a detector for detecting specific gaseous components, such as methane, and that for shutting down the heating operation in the event that excessive traces of the gaseous component are detected within the microwave cavity.

It is anticipated that the system shown in FIGS. 1-5 can be completely automated under the control of an operator disposed in a control room 62 separated from the car 12 by means of a transparent radiation absorbing shield 64. Optical sensors can be employed to measure the width of the car 12 and the extension submembers 42 and 44 can be positioned based on the width detection under the control of a master microprocessor control module 66 located in the control room 62. Similarly, actuation of the hydraulic cylinders 48, 50, 52 and 54 can be under the control of the microprocessor module 66, with the extension of the hydraulic cylinders 52 and 54 being controlled on the basis of sensor inputs indicative of the height of the car 12 as provided to the microprocessor module 66. Further sensors, also not shown and also coupled to the microprocessor module 66, can be provided to monitor the progress of the car 12 as the car 12 is transported beneath the hood 10 such that the magnetrons 18 are only activated to radiate microwave energy during the time that the car 12 is positioned beneath the parabolic reflector 24. Also shown schematically in FIG. 5 is a hydraulic power pack 68 coupled to the several hydraulically operated pistons 48, 50, 52 and 54 to enable operation of these devices. Additionally, reference numeral 70 refers to an air compressor and cooling device coupled to the magnetrons 18 and provided for magnetron temperature control. (See my related U.S. Pat. No. 4,256,944 for additional details concerning magnetron cooling.)

In order to present a brief overview of the power consumed by the operation of the apparatus shown in FIGS. 1-5, the following analysis is presented.

In a frozen coal car the coal particles are held together by the surrounding ice. The object of the apparatus of the invention is to supply just enough microwave energy to free the coal particles from the ice, so that the coal can be easily removed from the car 12. Microwave penetration of both coal and ice is about 100 times greater than for water. Likewise, heating of the ice and coal occurs due to the propagating microwave energy, but far lss than for water. As microwave energy propagates through the mass of coal embedded in ice, an important phenomenon occurs at the interface between the ice and coal. Since the ice and coal have different microwave electrical properties, there will be reflected energy at an interface, and this reflected energy will add directly to the incident energy to make the total energy density at an interface slightly greater than at points away from the interface. This means that the interface between ice and coal should be the first region within the volume to be melted.

From laboratory tests during a 1/10 scale model, the ice that thaws first is, in fact, a thin layer surrounding a chunk or particle of coal. From the size of a typical coal particle, and the measured thawing time for a given volume of coal and ice, the thickness of the melted layer can be determined.

If a typical coal particle is 3 cm in diameter, then the volume of the coal particle is 14.14 cm$^3$. A 1-foot cube would then contain 1000 particles. Tests have shown that all the coal particles within a 1-foot cube are completely thawed (freed from attachment to other particles) by 1000 watts of microwave power in a time of 2 minutes. The volume of ice at 0° C. that can be thawed by 1000 watts in 2 minutes is:

$$V_i = 1000 \frac{\text{joules}}{\text{sec}} \times 120 \text{ sec} \times \frac{1}{4.186 \text{ joules/cal}} \times \frac{1}{80 \text{ cal/cm}^3}$$

or $$V_i = 358 \text{ cm}^3$$

Hence, the ice that is actually thawed per particle is 358 cm$^3$/1000 particles, or 0.358 cm$^3$/particle. This corresponds to a 0.025 cm layer surrounding each 3-cm diameter coal particle.

From the above measurements, which have been confirmed many times by laboratory tests, the power required for a given thawing time, or the thawing time for a given power, can be determined for a total volume of ice and coal ($V_t$) as $$P_m(\text{watts}) \times t(\text{sec.}) = 4.186 \frac{\text{joules}}{\text{sec}} \times 80 \frac{\text{cal}}{\text{cm}^3} \times 0.358 \frac{\text{cm}^3}{\text{part.}} \times 1000 \frac{\text{part.}}{\text{ft}^3} \times V_t(\text{ft}^3)$$

or $$P_m \times t = 120,000 \times V_t$$

For example, a 8'×50'×10' or 4000 ft$^3$ volume, corresponding to a 90-ton coal car, can be thawed in 10 minutes with a total microwave power of 800 kW, or in 20 minutes with 400 kW. These numbers are somewhat conservative, since each and every coal particle does not need to be freed from the surrounding ice.

While the apparatus shown in FIGS. 1-5 is quite suitable for the heating, thawing and/or demoisturizing of the particulate material stored in the car 12, this apparatus employs relatively high power 30 KW CW magnetrons such as the Toshiba Model No. IM70A or the RCA Model No. 8684. The high powers are necessary to assure adequate microwave penetration of the full depth of the particulate matter 16. However, the microwave heating techniques in the invention can also be implemented using relatively low power magnetrons in view of the several embodiments shown in FIGS. 6–11c presented herewith. The basic concept of the microwave heating techniques employed in these embodiments is to physically penetrate the particulate material with a microwave radiating element and then gradually withdraw the microwave radiating element while the element is actually radiating energy, thereby assuring full heating, thawing and/or demoisturizing of the entire depth of the particulate material using relatively low power magnetrons.

Figure 6:
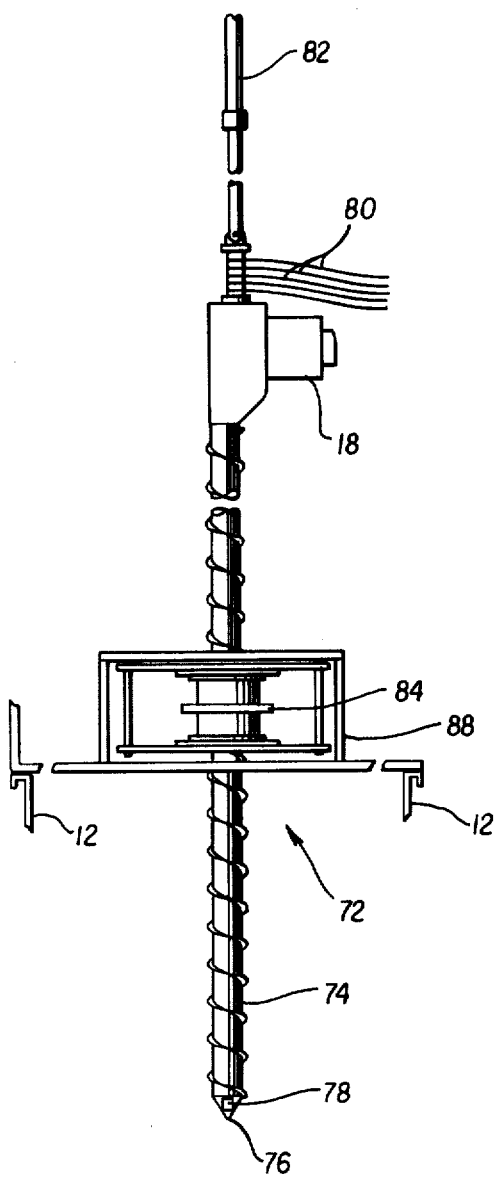
FIG. 6 is a schematic vertical cross-sectional end view of a first embodiment of a microwave drilling apparatus according to the invention.

FIG. 6 illustrates the first embodiment according to the invention where a microwave radiating element is caused to penetrate the depth of the frozen particulate material to be heated, wherein a microwave radiating element radiates energy into the particulate material during the withdrawal of the radiating element from the particulate material.

Figure 7:
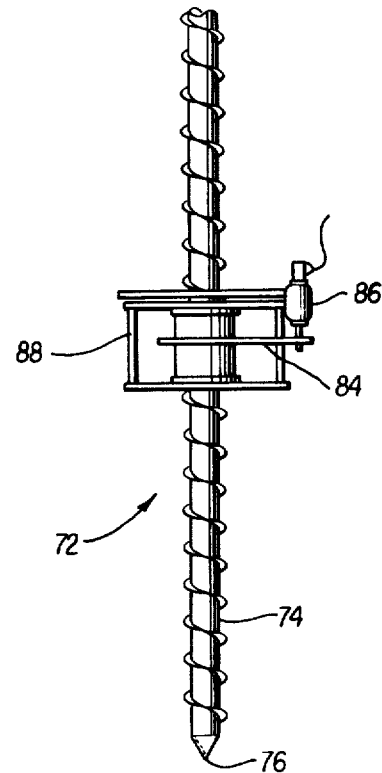
FIG. 7 is a schematic vertical cross-sectional view taken 90° to the view shown in FIG. 1.
Figure 8:
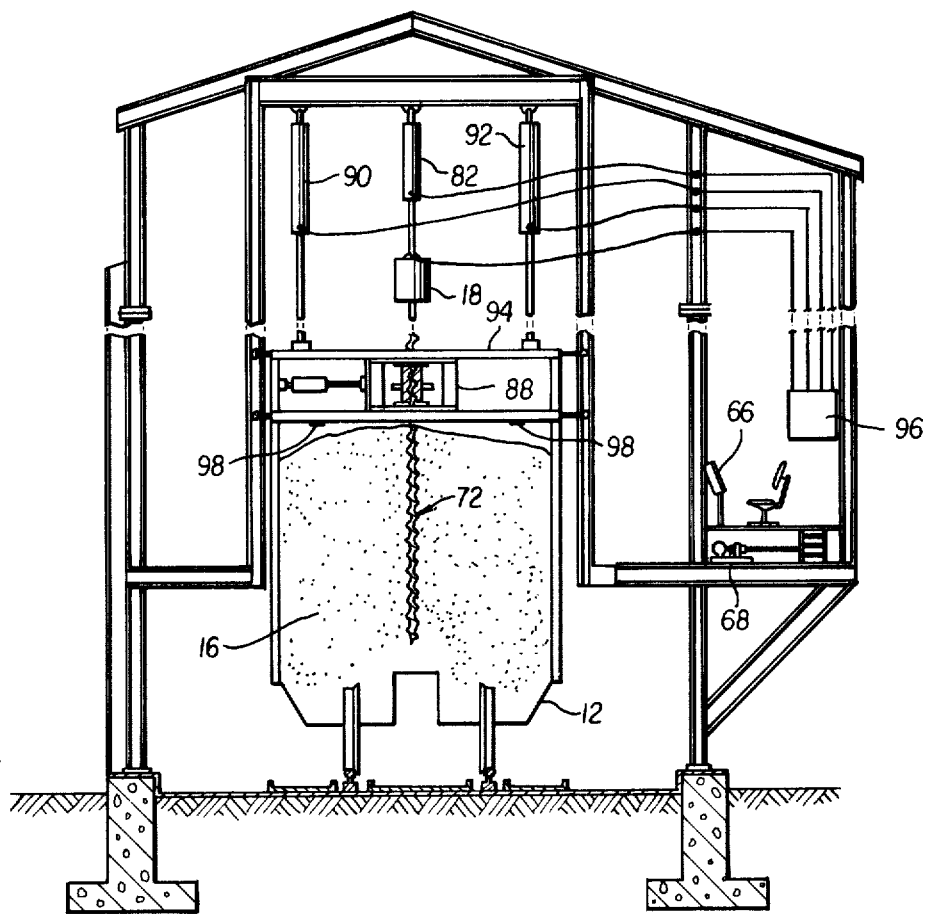
FIG. 8 is a schematic end view of a microwave auger drilling device utilized in the first embodiment shown in FIGS. 6 and 7.

As shown in FIGS. 6–8, the present invention includes a drilling device 72 capable of drilling down into a frozen particulate material to its full depth. The outward appearance of this microwave drilling device 72 is similar to a standard fluted drill or auger, designed with appropriate pitch and point for the diameter and speed of drill rotation. The drilling device is formed of a central shaft 74 which is hollow from top to bottom and is closed off at the bottom in order to form the point 76 of the drill. This hollow section is designed with appropriate cross-section so as to efficiently transmit microwave energy of a predetermined frequency, e.g. 915 MHz or 2450 MHz. Near the point 76 of the drilling device 72 and located on a side is a ceramic microwave transparent window 78 which couples the microwave energy to the surrounding frozen media and promotes heating, thawing and/or demoisturizing by microwave energy. This window 78 allows microwave energy to leave the waveguide while preventing the frozen material being drilled from entering into the wave guide cavity (antenna).

The microwave drilling device 72 can be used either by itself or with a multiplicity of others assembled in an array appropriate for the size and shape of the car 12 being used. If used singularly, a microwave source 18 can be affixed to the top of the device as shown in FIG. 6 with necessary slip ring power connections 80 provided in order that power is constantly supplied to the microwave source 18 while it is turning during the thawing operation. The rotation and lowering of the device during the drilling can be accomplished in a number of ways using direct power drive or indirect power drive incorporating chain, belt, gear, or hydraulic equipment. Of course, while rotation of the drilling-waveguide is occurring, downward force is applied, as for example from the hydraulic piston 82, so as to facilitate the penetration into the particulate material 16.

FIGS. 6–8 illustrate a microwave drilling device 72 implemented by means of a chain and sprocket drive mechanism 84 powered by a motor 86 supported on a frame 88.

FIG. 8 illustrates the application of the microwave drilling device 72 of the invention to the heating, thawing and/or demoisturizing of particulate matter 16 stored in a car 12. Only one drilling device 72 is shown, it being understood that in practice undoubtedly plural microwave drilling devices arranged in an array and ganged in a conventional drive system, such as chain and sprocket, belt, gear, or hydraulic equipment, will be employed.

In addition to the microwave drilling device hydraulic cylinder 82, FIG. 8 further shows additional hydraulic cylinders 90 and 92 coupled to a frame 94 to which it is presumed an array of microwave drilling devices 72 are mounted. Hydraulic lines to the cylinders 82, 90 and 92 are shown connected to a hydraulic power pack 96.

An advantage of the microwave drilling device 72 as applied to the heating and particulate material contained in a gondola-type car resides in the fact that it is expected that such a system will exhibit essentially no microwave leakage while avoiding the necessity of employing microwave shielding. Since the ceramic microwave transparent radiating window 78 is at the tip 76 of the shaft 74 of the drilling device 72, and since the magnetron 18 is only energized during the time that the radiating window 78 is embedded within the particulate material 16, essentially all the radiated microwave energy is absorbed by the frozen particulate material, which itself then serves as "shielding". However, in order to assure the safety of operation, it is anticipated that microwave sensors 98 will be placed along the bottom portions of the frame 94 in the vicinity of each drilling device 72 to measure the amount of radiation leakage. If a predetermined radiation leakage threshold is detected, then this fact can be communicated to the microprocessor control unit 66 to shut down operation of the magnetron associated with the particular drilling device 72 closest to the sensor detecting the condition of excess leakage.

In contrast to the embodiments shown in FIGS. 6–8, FIG. 9a illustrates another embodiment of the microwave drilling device of the invention wherein a stationary high power magnetron 18 is coupled via a microwave distribution system 100 to a plurality of microwave drilling devices 72'. The entire distribution system 100 and each of the microwave drilling devices 72' are supported on a frame 102 which can be raised or lowered by means of hydraulic cylinders 104 and 106. The cylinders 104 and 106 in turn are movably supported on beam 108. Also mounted on the frame 102 is a motor 110 coupled by a chain and sprocket drive system 112 to each of the drilling devices 72'.

Figure 9A:
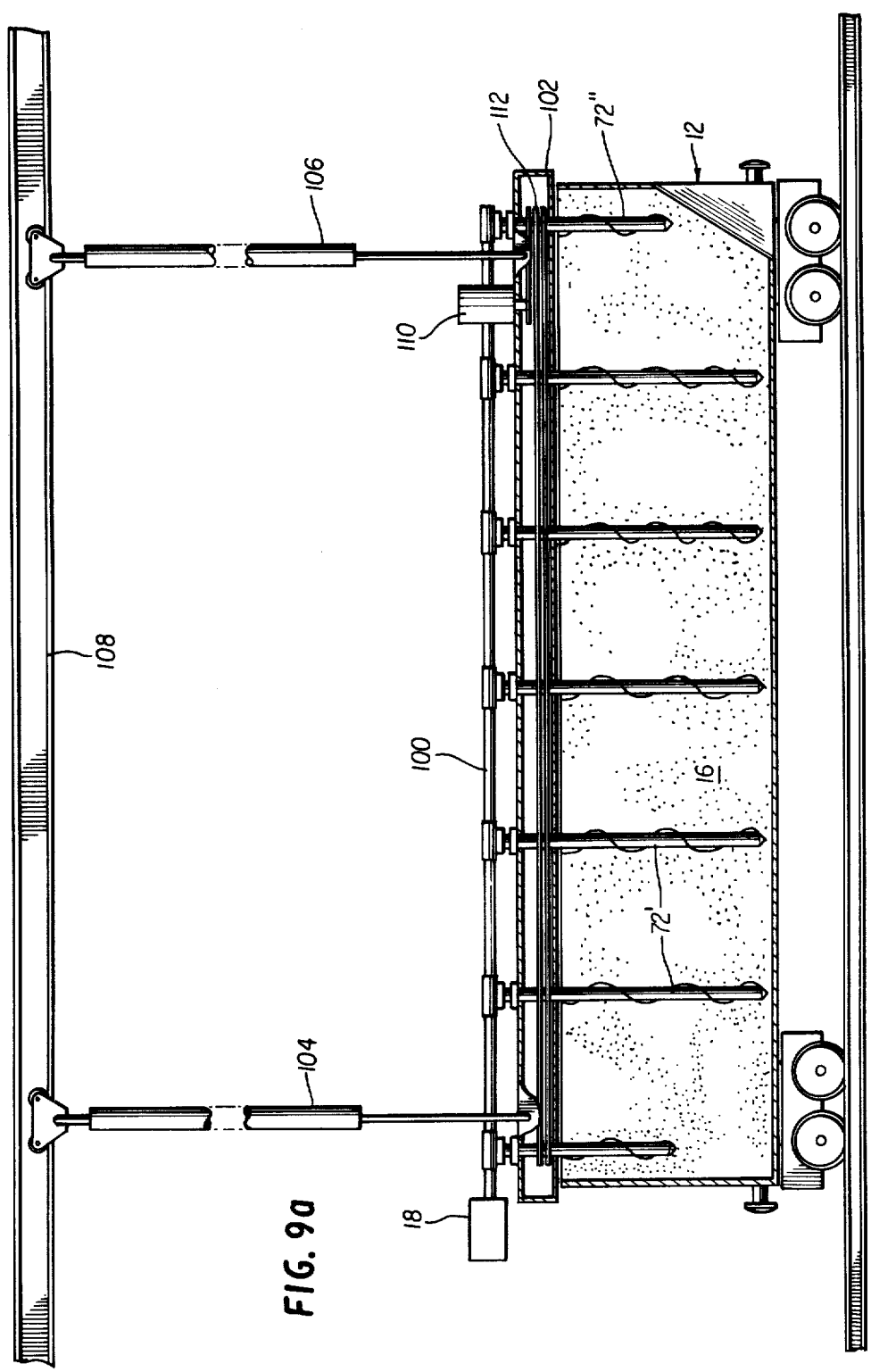
FIG. 9a is a schematic vertical cross-sectional view illustrating another embodiment of the invention employing a microwave auger drilling device, but characterized by a stationary microwave source and accompanying microwave distribution system.
Figure 9B:
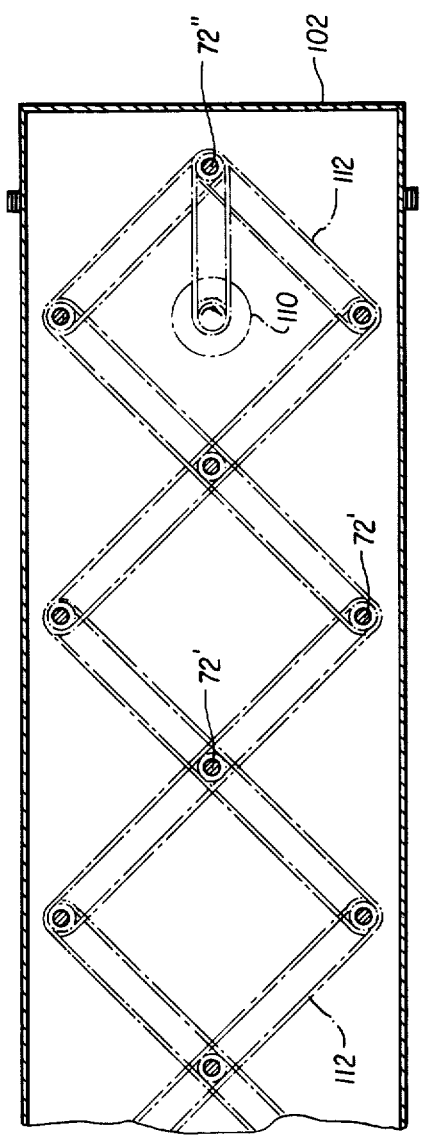

FIG. 9b is a schematic illustration of the chain and sprocket system 112. As shown, the motor 112 is coupled to an adjacent microwave drilling device 72" which in turn is coupled to adjacent microwave drilling devices 72' by means of respective chain and sprocket drive mechanisms. It should, however, be understood that although chain and sprocket drive mechanisms are shown, the drive system 112 of the invention can be readily implemented using other conventional drive mechanisms, such as worm gears, right angle gear drive units coupled to a universal joint, etc.

Figure 10:
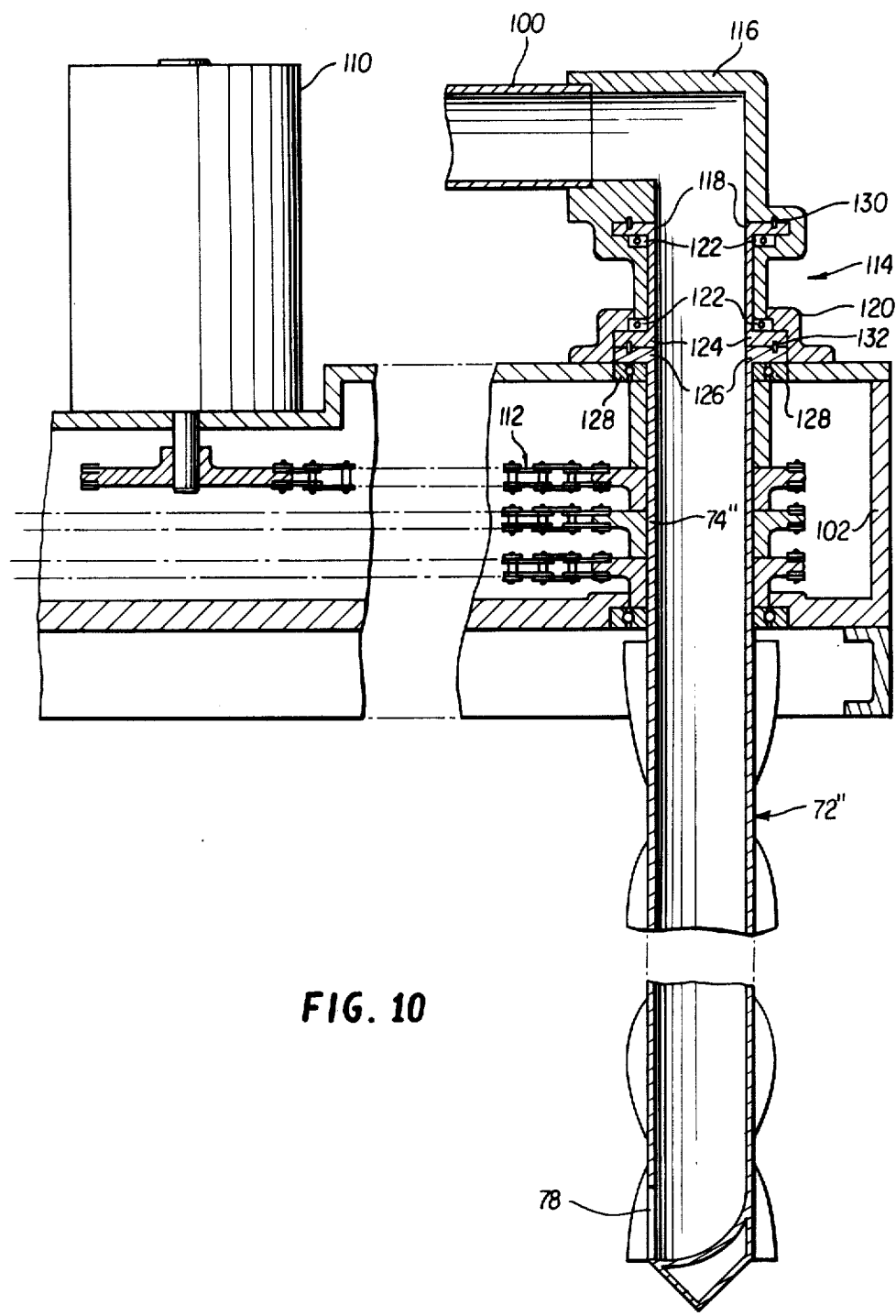
FIG. 10 is an enlarged cross-sectional view of the right end of the apparatus shown in FIG. 10 illustrating the microwave auger drilling device and microwave power distribution system.

FIG. 10 illustrates in more detail the mechanical and electrical connection of the microwave drilling device 72" to the drive system 112 and the microwave distribution system 100. As, shown, the microwave distribution system 100 is coupled to a waveguide rotary coupling 114 including a stationary head section 116, a cylindrical flanged coupling section 118, and a stationary support flange 120. Plural bearings 122 are provided at the abutment of the coupling section 118 with the head section 116 and the support flange 120 to enable rotation of the coupling section 118. A bottom flange 124 of the coupling section 118 is fastened to an upper lip 126 of the shaft 74" of the drilling device 72". Additional bearings 128 are provided at the abutment of the upper lip 26 of the shaft 74" with the support frame 102. Also provided are annular RF choke rings 130 and 132 at the interfaces of the coupling section 118 with the head section 116 and the shaft 74".

Coupling section 118 has a circular waveguide cross-section, while the shaft 74" has a rectangular waveguide cross-section. In practice, the circular cross-section of 118 will be mated to the rectangular cross-section of shaft 74" by means of a conventional waveguide transition coupling (not shown).

When used in an array, the placement of the microwave drilling devices 72, 72' is based on the configuration of the car 12 and the thawing power of each drilling waveguide assembly. The selection of appropriate power output for each of the magnetrons of an array of drilling devices each employing a microwave drilling device of the type shown in FIGS. 6–8, as well as the power distribution and the microwave distribution system 100 would be a design consideration in order to ensure thorough thawing of a car's contents. When grouped in an array, it is expected that combinations of the embodiments shown in FIGS. 6–10 would be implemented. Some devices can each have their own microwave source, as shown in FIGS. 6–8, or sub-groups of the microwave drilling devices can have coupled thereto a single microwave generator providing the microwave energy through necessary connectors and rotary joints. Likewise, rotation of the devices for drilling can be provided through chain, belt, worm gear or hydraulic systems, with either one major rotational power source or a multiple of smaller sources.

During operation, the car 12 is placed underneath the frame 102, whereupon rotation of the microwave drilling devices 72, 72' is started and the drilling process carried out. After the microwave drilling devices have penetrated to the bottom of the container, the microwave generator(s) 18 is turned on and microwave energy is coupled through the ceramic side windows 78 near the tips 76 of the microwave drilling devices 72, 72' and absorbed into the frozen particulate matter 16. The microwave drilling devices, 72, 72' are then counter-rotated and extracted from the media at an appropriate rate while microwave energy is being continuously emitted through the window 78, thereby causing a solid cylinder of material around the drilled hole to thaw from the bottom to the top of the particulate material 16. Once the ceramic windows have reached the surface, or a predetermined distance beneath the surface to minimize microwave leakage, the microwave generator(s) is turned off and the car 12 is ready to be emptied.

Figure 11A:
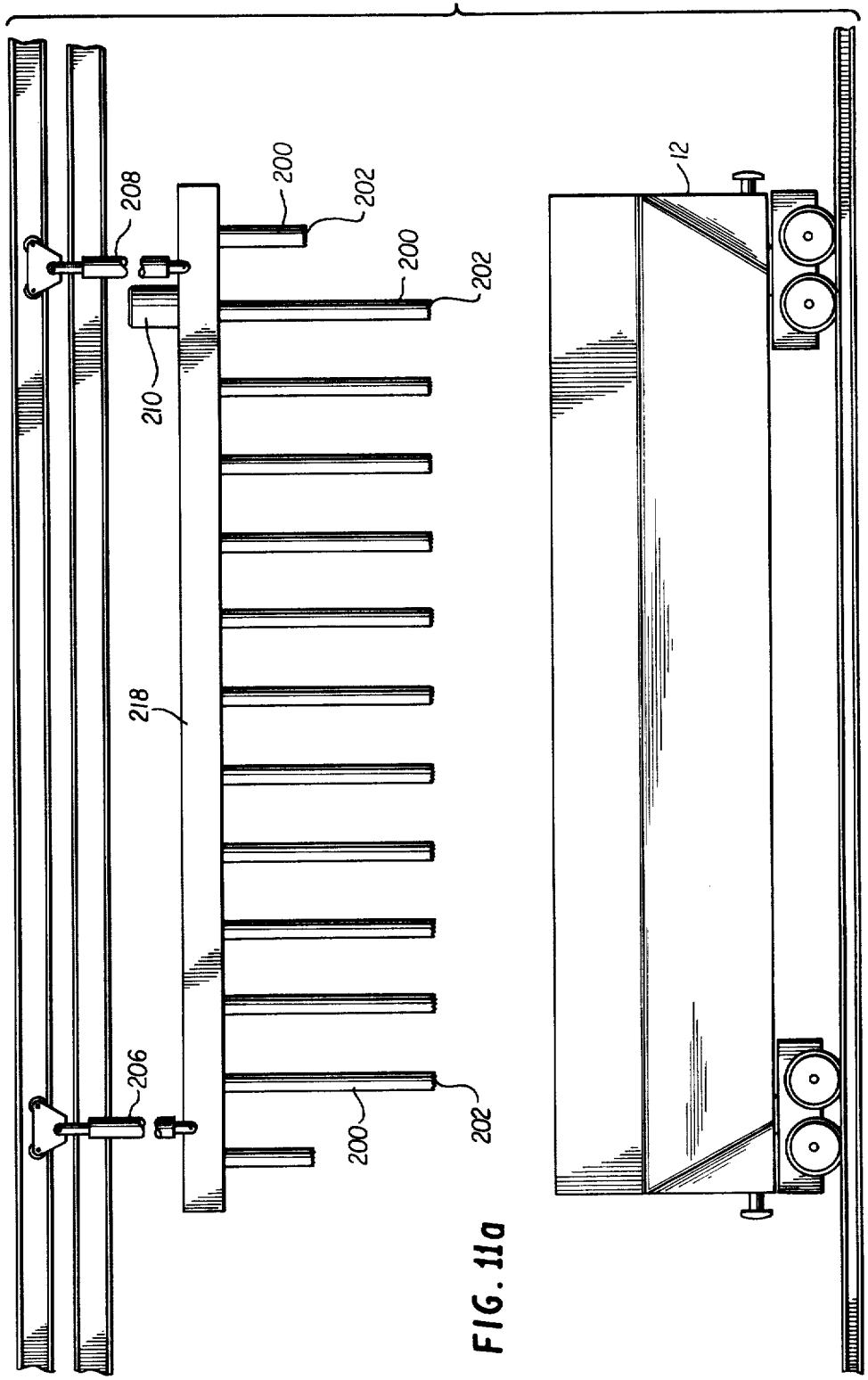
Figure 11B:
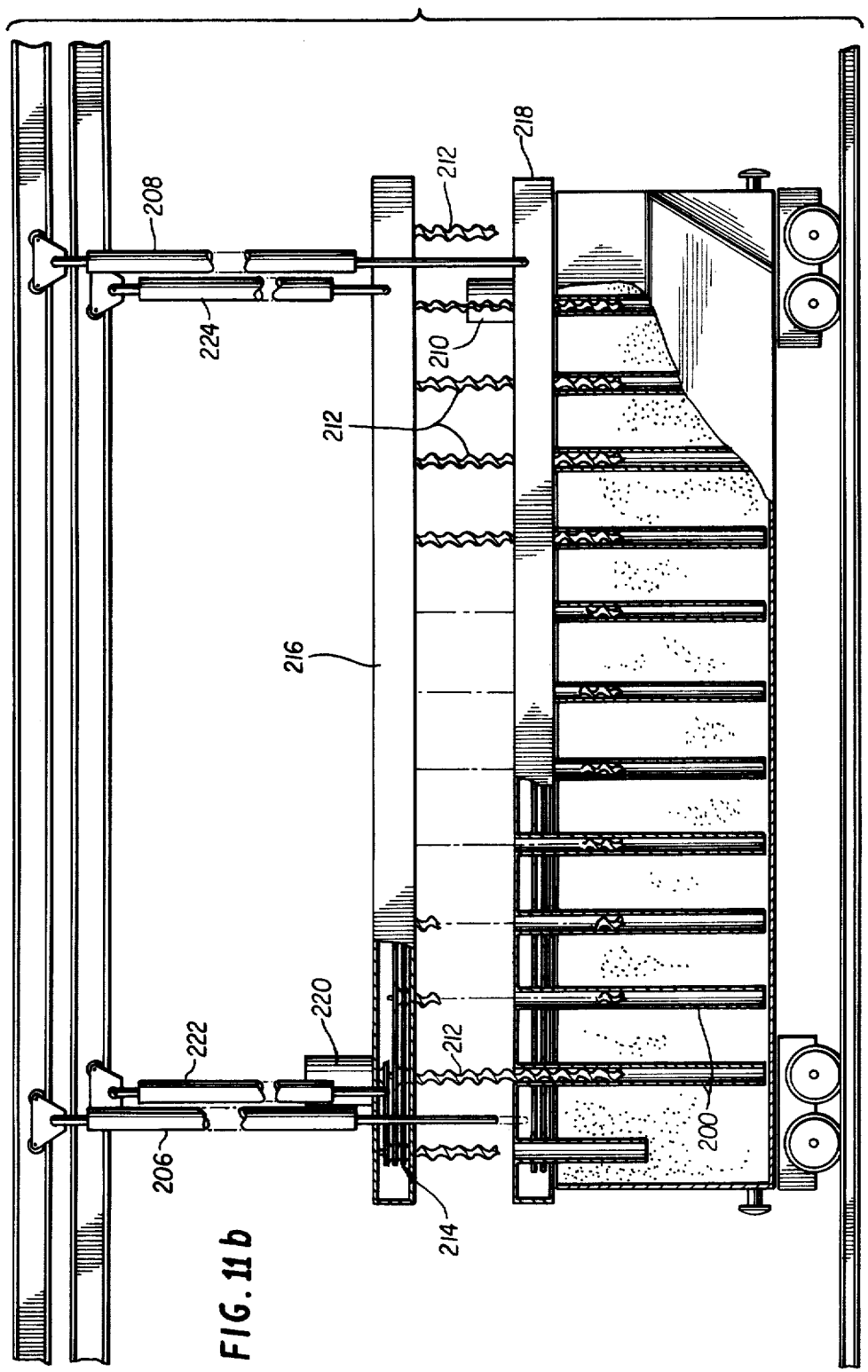

FIGS. 11a–11c illustrate another embodiment of the invention which performs all the functions necessary to thaw the contents of a car 12, but involves multi-piece drilling devices instead of the single piece drilling devices above described. In the embodiments shown in FIGS. 11a–11c, each multi-piece drilling device is simplier in design and construction than the microwave drilling devices previously described. According to FIGS. 11a–11c, there is firstly provided a single or an array of core-drilling devices, each of which is simply a tube 200 having a serrated or saw-tooth open end 202. Each core drill tube 200 is coupled to a chain and sprocket drive system 204 similar to the drive system 112 shown in FIG. 9b. Drive system 204 produces rotation in each core drill tube 200 such that as a downward pressure is produced by hydraulic cylinders 206 and 208 (FIG. 11a) the core drill tubes 200 penetrate the particulate material 16 to a point in the vicinity of the bottom of the car 12. Motor 210 provides the chain and sprocket drive power for the drive system 204.

As shown in FIG. 11b, there is further provided a single or an array of augers 212 used to extract particulate material 16 from the hollow centers of the core drill tubes 200. The augers 212 have a respective drive system 214 mounted in a movable frame 216 positioned above a movable core tube frame 218 which houses the core tube drill drive system 204. Motor 220 is also mounted on the frame 216 to power the auger drive system 214. Hydraulic cylinders 222 and 224 are coupled to the movable auger frame 216 and are provided to apply a downward force on the augers 212 during removal of particulate material 16 from the hollow centers of the core drill tubes 200.

In FIG. 11c there is shown a third component of the core drilling embodiment of the invention in the form of a microwave distribution system 222 supported by a support frame 224 which is lowered in communication with the core drill tubes 200 by means of hydraulic pistons 226 and 228. The microwave distribution system 222 includes a single or an array of waveguide radiators 230 which fit down into the hollow centers of the core drill tubes 200. Since the waveguide radiators do not necessarily have to rotate, the microwave generator connection from a magnetron 232 to the distribution system 222 is simplified. At the radiating end of the waveguide radiators, accommodations are made for uniform microwave energy coupling to the surrounding particulate material 16. As is seen in each of FIGS. 11a–11c, along with the various pieces of equipment therein shown and described above, is the associated superstructure necessary for translation, lowering and raising of the several assemblies.

During operation of the embodiments shown in FIGS. 11a–11c, the core drill tubes 200 are pressed downwardly into the particulate material by means of the respective hydraulic pistons 206 and 208. Upon rotation of the core drill tubes 200 by means of the drive system 204, the core drill tubes 200 penetrate the particulate material 16 and the hollow central portions of the core drill tubes are filled with the particulate material 16 as penetration proceeds. Once the core drill tubes have penetrated to the bottom of the container 12, the auger assembly formed of augers 212, drive system 214, frame 216 and motor 220 are positioned over the core drill assembly, whereupon the auger assembly is lowered such that each individual auger 212 fits down into the center of a respective core drill tube 200. The augers 212 are rotated and pressed downwardly into the particulate material 16, causing the hollow centers of the core drill tube to be emptied. Thereafter, the auger assembly is raised and moved away from the core drill tube assembly, leaving the individual core drill tubes 200 in place in the particulate material 16. Then, the waveguide assembly is translated over the core drill tube assembly and lowered by means of the pistons 226 and 228 such that the waveguide radiators 230 are disposed at the bottom of the core drill tubes 200. The core drill tube assembly is then raised slightly to permit microwave radiation from the waveguide radiators 230 into the particulate material 16. Then, the magnetron 232 is activated and the waveguide assembly and the core drill assembly are raised together. The emanating microwave energy emitted from each waveguide radiator 230 fills a solid cylindrical section of media about the core-drilled holes. Prior to total withdrawal of the equipment from the particulate material, as can be conventionally sensed, the magnetron 232 is deactivated, microwave radiation ceased, and the car 12 is then ready to be emptied.

The electrical power requirements of the equipment of the invention as above described can be provided from standard utility power, or in the case of a remote operating site, can be supplied by a diesel generator or other portable power source. Control of all operating functions can be from a single point or operator's console, as shown, for example, in FIGS. 5 and 8, and generally the sequence of operating functions will be automated. Safety interlock systems, as discussed in connection with the provision of microwave leakage detectors 98 in FIG. 8, can be included in each of the above-described embodiments to protect personnel and equipment and prevent operation of the equipment without a car 12 in proper position and/or adequate shielding (FIGS. 1–5).

The microwave energy necessary to thaw the frozen particulate material 16 can be generated externally and directed into the container by cylindrical or rectangular waveguides. As envisioned, the microwave energy is produced by conventional devices such as magnetrons or klystron tubes. The microwave energy is generated at a frequency suitable for efficient microwave heating, thawing and/or demoisturizing, ease of transmission, and dispersion by conventional waveguide means. The frequency is also chosen to help promote each of containment and leakage control. Initial tests have shown the frequencies in the 900–2450 MHz range are suitable.

In the case of multiple waveguides, the microwave energy may be divided from a single source into multiple waveguide paths and, depending upon which drilling configuration is employed, introduced into the frozen particulate material by means of rotary or stationary transitions to the radiating antennas. Perhaps, the more practical approach is that disclosed in connection with FIGS. 6–8 involving localized generation of microwave energy at each drilling device, which eliminates the need for complex waveguide distribution components. This would further permit controlled heating of selected problem areas in the frozen particulate material. Further, a multiplicity of identical microwave components would also facilitate manufacture and repair.

Coupling to the frozen particulate material can be by means of a horn or slotted array antenna, sealed and protected by a microwave window(s) or part(s) or ceramic or other suitable material, which is then an integral part of the drilling device.

Additionally, the waveguides of the embodiments above-described may be filled with a dry nitrogen gas under a slight positive pressure, such as 1–10 lb. per sq. in., in order to exclude moisture from the system. Output power and/or temperature sensors attached to the exterior surface of the various drilling devices can be used to monitor the extent of media heating.

As is readily understood in view of the above disclosure, the microwave drilling techniques herein disclosed are useful in connection with several new applications, and in particular insect pest control and petroleum recovery.

In recent years, Southern portions of the United States have experienced a growing threat due to the invasion of fire ants migrating northwardly from South America. These fire ants present a significant threat to agricultural crops and in view of their poisonous, potentially lethal venom, can be fatal to human and animal life. According to the invention, it is proposed to use the microwave techniques and apparata above described to control the invasion of fire ants by heating the ants and their larvae to lethal temperatures (approximately 50° C. for 10 min.). According to the invention, the microwave drilling device 72 discussed above in connection with the disclosure of FIGS. 6–8 can find important utility in the irradication of the fire ants.

Figure 12:
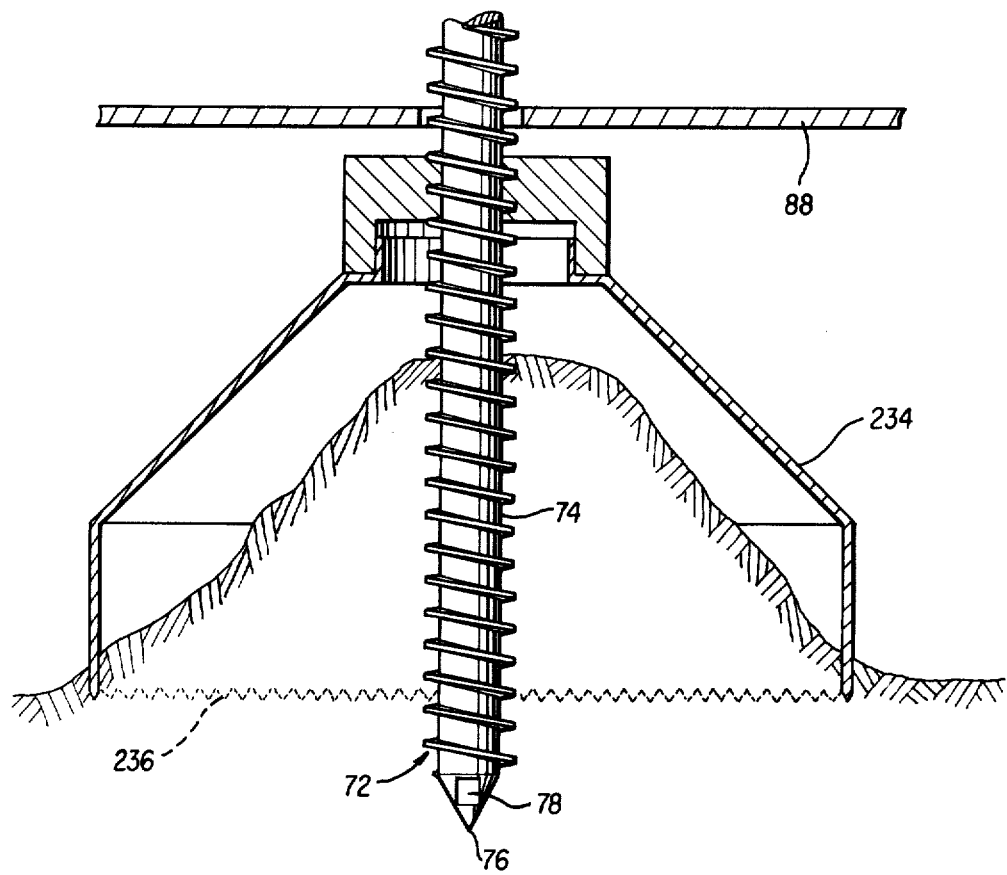
FIG. 12 is a schematic cross-sectional view illustrating the application of the microwave auger drilling device to the problem of insect control.

FIG. 12 schematically illustrates the utilization of the microwave drilling device 72 described above for use in connection with insect pest control. For simplicity's sake, only the primary microwave components are shown in FIG. 12, and not shown therein is the magnetron 82 or drive mechanism 84 previously described. Thus, as shown in FIG. 12, the only component additionally provided for insect control purposes is an antenna hood provided for focusing of microwave energy into the earth and for minimizing microwave leakage during irradiation of the soil. It is envisioned that antenna hood 34 will be provided with a serrated bottom surface 236, which, like the core drill tube discussed above can penetrate the soil upon rotation of the antenna hood 234 by conventional chain and sprocket drive means (not shown). In practice, the microwave drill shaft 74 penetrates the insect mounds a predetermined depth into the soil, whereupon the power source of the magnetron provided as part of the microwave drilling device 72 is activated, the shaft 74 is extracted, and again a solid cylinder of soil and insect mound is irradiated with microwave energy lethal to the insects and larvae irradiated.

The following is a more detailed analysis of the energy requirements and operation of the application of the microwave drilling device 72 to the problems of fire ant irradication according to the invention. For the purposes of the energy budget analysis, it is assumed that the tip 76 of the microwave drilling device 72 is disposed in the upper portion of the antenna hood 234 and not penetrating the insect mounds. It is envisioned that a rectangular horn antenna hood 234 having a 35.5×27.5 in. aperture is placed flush with or barely penetrating (2–12 in.) the ground and on top of the fire ant nest. A 10 kW 915 MHz microwave generator is used to apply power through the shaft 74 and horn antenna hood 234 and into the nest embedded in the soil.

The near field or induction field of the horn antenna hood 234 extends a distance $$r_1 = A/2\lambda$$

in front of the antenna (in this case into the soil), where A is the aperture area and $\lambda$ is the wavelength in the soil. At 915 MHz in sandy soil with about 5% moisture, $\lambda$ is $$\lambda = \frac{11.8 \times 10^9 \text{ inches/sec}}{0.915 \times 10^9 (\epsilon/\epsilon_o)^{\frac{1}{2}}} = 6.45 \text{ inches}$$

if the dielectric constant of soil is $\epsilon/\epsilon_o = 4$ (Hipp, "Soil Electromagnetic Parameters as Functions of Frequency, Soil Density, and Soil Moisture", *Proc. IEEE*, Vol. 62, pp. 98–103, 1974). Thus, with $A = 35.5 \times 27.5 = 976.25$ sq. inches, we have $$r_1 = \frac{976.25}{2(6.45)} = 75.68 \text{ inches} = 6.3 \text{ feet.}$$

This means that the irradiation of the fire ants will be entirely within the near field of this rectangular horn antenna.

The advantage of using the near field is that the power density does not diminish very much with distance into the soil, since both a radiation field and an induction field are present. In fact, if the power density at the antenna aperture is taken as $$W_o = \frac{P}{A} = \frac{10,000 \text{ watts}}{976.25 \text{ sq. inches}} = 10.24 \text{ W/in}^2 = 1.6 \text{ W/cm}^2$$

the power density may go up to 4 $W_o$ or 6.4 W/cm$^2$ at points within the near field.

For convenience in calculating the heating of fire ants, assuming that the transmitted power density within the near field is $W_o$; then the electric field intensity ($E_o$) within the soil is (W. J. Joines, et al, "Microwave Power Absorption Differences Between Normal and Malignant Tissue," *Int. J. Radiation Oncology Biol. Phys.*, vol. 6, pp. 681-687, 1980):

$$W_o = \frac{Re\eta}{2|\eta|^2} E_o^2$$

or $$E_o = \frac{2W_o|\eta|^{2\frac{1}{2}}}{Re\eta}$$

where $\eta = 377/(\epsilon_2^*)^{\frac{1}{2}}$ ohms is the intrinsic impedance of the soil. Taking the relative complex permittivity of the soil ($\epsilon_r^*$) to be about $4 - j\,0.2$ at 915 MHz ( Hipp., supra), the electric field intensity is $$E_o = (\eta W_o)^{\frac{1}{2}} = 19.42(W_o)^{\frac{1}{2}}$$

or if $W_o$ is 1.6 W/cm$^2$, then $E_o$ is 24.56 volts/cm.

The fire ants and their larvae are small compared with the microwave wavelength ($\lambda$) in the soil. Hence, the electric field intensity within the insects will be approximately (Joines et al, "Power Density, Field Intensity, and Carrier Frequency Determinants of RF-Energy Inducted Calcium-Ion Efflux from Brain Tissue," *Bioelectromagnetics*, vol. 1, pp. 271-275):

$$E_i = \frac{3E_o}{2 + (\epsilon_{ir}^*/\epsilon_r^*)}$$

Taking the relative complex permittivity of the fire ant ($\epsilon_{ir}^*$) to be $4 - j\,0.4$ (the same as for rice weevil at about 915 MHz; see S. O. Nelson, "Electrical Properties of Agricultural Products—A Critical Review," *Trans. ASAE*, VOL. 16, No. 2, (1973)):

$$E_i = \frac{3E_o}{2 + \frac{4 - j0.4}{4 - j0.2}} = E_o$$

Thus, the absorbed power per unit volume within a fire ant is $$P_a = (\tfrac{1}{2})\sigma E_i^2 = (\tfrac{1}{2}) 2 \times 10^{-4}(24.565)^2 = 0.0603 \text{ watts/cm}^3$$

where the conductivity ($\sigma$) of the fire ant is assumed to be the same as for a rice weevil (Nelson, supra).

Neglecting heat loss from the region, the initial temperature rise (T) of a fire ant will be a function of the absorbed power ($P_a$), the heating time (t) in seconds, the density of the fire ant ($\rho$) in grams/cm$^3$, and the specific heat of the fire ant (c) in joules/gram °C. as $$T = \frac{P_a t}{\rho c}$$

Taking $\rho$ to be 0.49 gram/cm$^3$ as given by Nelson, supra, for rice weevil, and assuming c to be 4.186 joules/gram °C. (the same as for water, although c is probably less for fire ants), we have $$T = \frac{0.0603 \, t}{0.49 \times 4.186} = 0.02943 \, t$$

or in 20 minutes (1200 seconds) the temperature rise would be 35.3° C.

The above analysis is somewhat conservative in that it assumes that the radiating window 78 has not penetrated the fire ant mount or soil during irradiation. It is expected that considerably less time will be necessary to assure complete ant eradication with a concomitant increase in the total volume affected by microwave radiation due to the drilling feature of the invention.

It is noted that the fire ants build nests in open fields in southern coastal U.S. regions. The nest dimensions may be 3 ft. deep and 3 ft. in diameter. Microwave penetration of these rather sandy soils is greatest during dry weather, and during the cold weather the fire ants tend to stay in their nests. Hence, the ideal times for microwave irradiation of fire ants appears to be during the dry cold months of winter.

From the above discussion, it is seen that in many instances it will not be necessary to employ the more complicated microwave drilling device 72 of the invention for insect control, but instead it is possible merely to employ a microwave unit having a microwave radiating source such as a magnetron coupled to an upper portion of an antenna hood, which may be a conventional rectangular horn. Placement of the horn over an insect mound, and activation of the magnetron, should be sufficient in many instances to penetrate adequately the soil as required to eliminate the pests. Where deeper soil penetration occurs, however, the microwave drilling device 72 of the invention can be employed.

Recapitulating, this invention uses microwave energy to heat the fire ants and their larvae in their habitat to a lethal temperature for a specific time period. Since the fire ant builds mounds in open fields, along roadway right-of-ways, parks and mainly in open areas of the southern coastal regions, their mounds would be accessible to a vehicle carrying a microwave unit. Microwave penetration of the rather sandy soils would be greatest during dry weather and during the early spring while a coolness tends to keep the ants in their mounds.

For insect control, the microwave unit can be assembled on a vehicle capable of traversing open terrain. The vehicle can be self-sufficient in generating enough electrical power to operate the microwave unit, which would be mounted on a flexible arm capable of locating the device over the fire ant mound in the proximity of the vehicle. Upon arriving at a location, it would be possible to treat several ant mounds without moving the vehicle.

The basic concept used to destroy the fire ants is that of heating the insects with microwave to a lethal limit. It is deduced from data available that a temperature of less than 50 degrees Centigrade for a time span of approximately 10 minutes would be sufficient to eliminate adult ants, the larvae and their eggs.

The microwave unit has a microwave capability of penetrating the sandy type soils found in most coastal regions up to a depth of approximately 6 feet. This is dependent upon the coarseness, moisture and composition of the soil. However, the depth of penetration would be similar to the depth the ants could construct their mounds in the same soil conditions. These projections are based on data published by the USDA and local state Agricultural departments from the southern U.S. coastal regions.

In addition to the capability to generate the microwave energy required, the vehicle would contain equipment capable of probing the treated area to determine that the temperature required had in fact been reached.

If required, the vehicle can have an additional attachment to level the mounds after treatment to allow useful cultivation of the area. In some instances of highly infected areas it might be more economical to have a second reclaimation vehicle that would allow more efficient use of the primary vehicle.

A four wheel drive vehicle equipped with dual carburation for gasoline and propane can be equipped with a MOTRIM unit capable of 360 degree rotation, and an auxiliary generator capable of generating 20 KW of electrical power. The use of propane for the dual carburation of the vehicle and the other equipment motors allows longer operation times between refueling, thus giving a more rapid and efficient operation.

A 10 KW magnetron can be mounted on the end of a foot flexible arm. The magnetron can be liquid cooled to allow for the most efficient and effective use in the field. It is possible, if required, to use the auger type microwave drilling device of the invention for drilling into the mounds should heavy soil require it. It is anticipated that this type of attachment would be required only in the coarser and heavier soils away from the coastal regions. Otherwise, a simpler design according to the invention employs a magnetron having a housing or horn rectangular in shape, blending into a circular skirt to give maximum wave propagation and area coverage.

The microwave unit can have shielding that will prevent any stray radiation from occurring and also act as a deterrent to contain the more active ants in the field of treatment. It will also tend to attract the ants away from the equipment operators. Further, the utilization of microwave energy will result in sterilization of the soil against fungus, bacteria, etc., with no harmful environmental effects.

Figure 13:
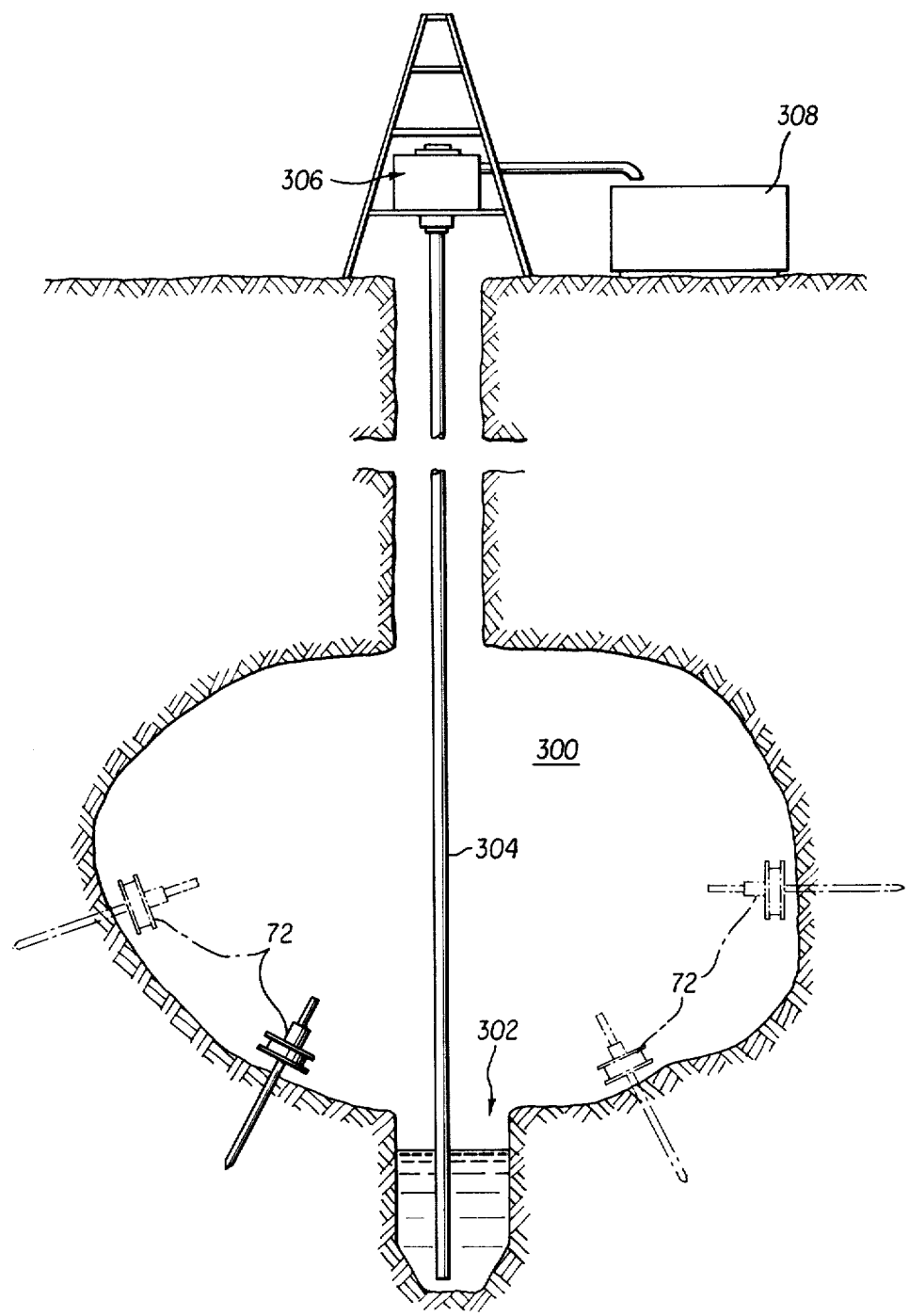
FIG. 13 is a schematic cross-sectional view illustrating the application of the microwave auger drilling device of the invention to the mining and recovery of trapped oil deposits.

Yet another application of the microwave heating techniques according to the invention are shown in FIG. 13, wherein the microwave drilling device 72 is shown in connection with an oil recovery utilization. As shown schematically in FIG. 13, the microwave drilling device 72 can be used to penetrate an oil-bearing geological formation to heat the oil trapped in the formation. Once heated, the oil will liquify and exhibit low viscosity whereby the heated oil can easily be recovered. The oil recovery technique shown in FIG. 13 envisions that a relatively large cavern 300 will be created by conventional means in the geological formation. The cavern 300 will include a trench 302 in communication with a pipe 304 coupled to a pumping station 306. Plural microwave drilling devices 72 are shown penetrating the walls of the cavern 300 such that upon the application of microwave energy from the magnetrons associated with each of the microwave drilling devices 72, the oil is liquified and then collects within the trench 302. The pumping station 306 then withdraws the collected liquified oil via the pipe 304 for storage in a storage vessel 308.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for heating, thawing and/or demoisturizing materials stored in a gondola-type container having an open face and a predetermined length and width, comprising:
   shielding hood means adapted for forming a shielded microwave cavity in combination with said container, said hood means defining a longitudinal axis and having front and back ends separated by a distance along said longitudinal axis of at least twice the length of said container, said hood means comprising shielding means for blocking microwave leakage from the microwave heating cavity formed by said hood means and said container, said shielding means disposed in contacting engagement with said container to form said cavity in the space enclosed between said shielding hood means and said container;
   microwave radiation means mounted in the middle of said shielding hood means for radiating the materials within the container with microwave energy upon contacting engagement of the shielding hood means and the container; and
   means adapted for transporting said container from the front end to the back end of said hood means with said shielding means in contacting engagement with said container, said microwave radiation means radiating said materials as said materials pass adjacent thereto;
   whereby the materials stored in the container within the microwave cavity formed by the container and the shielding hood means are heated, thawed, and/or demoisturized by the microwave energy produced by the microwave radiation means.

2. An apparatus according to claim 1, further comprising:
   said shielding hood means comprising a center member, a pair of side members hingedly connected to respective sides of said center member; and
   means for pivoting said side members about the respective hinged connections to said center member into contacting engagement with said container.

3. An apparatus according to claim 2, for use in combination with a gondola type container having sides and opposed ends perpendicular to said container sides, comprising:
   said shielding means including first and second shielding strips attached to respective side members of said hood means for engagement with said container upon pivoting, and third and fourth shielding strips attached to the ends of said container for contacting engagement with said center member of said shielding means.

4. An apparatus according to claim 3, wherein said shielding means comprises:

brush strips having microwave radiation reflecting brush bristles.

5. An apparatus according to claim 4, wherein said shielding means comprises:
stainless steel brush strips.

6. An apparatus according to claim 1, further comprising:
sensing means for detecting when said container is adjacent said microwave radiation means; and
control means coupled to said sensing means for activating said microwave radiation means only when said container is disposed adjacent said radiator.

7. An apparatus according to claim 1, wherein said hood means comprises:
a carbon steel plate structure.

8. An apparatus according to claims 2, 3, 4 or 5, further comprising:
said hood center member comprising extendable submembers coupled to a stationary member, said extendable members coupled to said side members via said hinged connection; and
means for extending said extendable members whereby the width of said hood means is adjustable.

9. An apparatus according to claim 1, further comprising:
gas evacuation means for evacuating gases from the microwave cavity formed between said hood means and said container.

10. An apparatus according to claims 1, 2, 3, 4, 5, 6 or 7, wherein said microwave radiation means comprises:
plural magnetrons arranged in a row perpendicular to the longitudinal axis of said hood means.

11. An apparatus according to claim 10, wherein sid microwave radiation means comprises:
a parabolic reflector disposed behind said row of magnetrons for focusing microwave radiation produced by said radiation means.

12. An apparatus according to claim 11, wherein said parabolic reflector defines a longitudinal axis transverse to the longitudinal axis of said hood means.

13. An apparatus according to claim 8, wherein said microwave radiation means comprises:
plural magnetrons arranged in a row perpendicular to the longitudinal axis of said hood means.

14. An apparatus according to claim 13, wherein said microwave radiation means comprises:
a parabolic reflector disposed behind said row of magnetrons for focusing microwave radiation produced by said radiation means into said materials in said container.

15. An apparatus according to claim 14, wherein said parabolic reflector defines a longitudinal axis transverse to the longitudinal axis of said hood means.

16. A method for heating, thawing and/or demoisturizing materials stored in a gondola-type container having an open face and a predetermined length and width, comprising:
providing a hood defining a longitudinal axis and having front and back ends separated by a distance along said longitudinal axis, wherein said distance is at least as long as twice the length of said container;
mounting a microwave radiation source in said hood midway between said front and back hood ends,
providing said hood with a shielding material;
positioning said container in contacting engagement with said shielding material such that a microwave heating cavity is formed in the space between said hood, said shielding material disposed around the periphery of the engagement interface between said hood and said container to block microwave leakage from said microwave cavity;
transporting said container from said front end to said back end of said hood while said shielding means is in contacting engagement therewith;
energizing said microwave radiation source to emit microwave energy into the materials contained in said container while said materials are transported past said source, thereby heating, thawing and/or demoisturizing said material within said container.

17. A method according to claim 16, further comprising:
focusing microwave radiation produced by said microwave source into said materials stored within said gondola-type container.

18. A method according to claim 16, further comprising:
evacuating gases released from said materials stored in said gondola-type container from the microwave cavity formed by said hood and said container during energization of said microwave source.

* * * * *